United States Patent [19]
Machtig et al.

[11] Patent Number: 5,923,469
[45] Date of Patent: Jul. 13, 1999

[54] EYE CONTACT REAR SCREEN IMAGING

[75] Inventors: Jeffrey S. Machtig, Lake Forest; Steve H. McNelley, San Juan Capistrano, both of Calif.

[73] Assignee: Videotronic Systems, San Juan Capistrano, Calif.

[21] Appl. No.: 08/542,309

[22] Filed: Oct. 12, 1995

[51] Int. Cl.⁶ ............................. G03B 21/56; G03B 21/60
[52] U.S. Cl. ........................... 359/451; 359/458; 359/460
[58] Field of Search ...................... 359/443, 451, 359/458, 460; 472/57, 60, 61, 63, 70, 137; 353/7, 79, 80; 348/40, 42, 51, 121

[56] References Cited

U.S. PATENT DOCUMENTS

| | | |
|---|---|---|
| 1,653,180 | 12/1927 | Jalbert . |
| 3,053,144 | 9/1962 | Harries et al. . |
| 3,973,840 | 8/1976 | Jacobs et al. . |
| 4,978,216 | 12/1990 | Liljeren et al. . |
| 5,193,015 | 3/1993 | Shanks ..................................... 359/443 |
| 5,194,955 | 3/1993 | Yoneta et al. ............................ 358/209 |
| 5,221,937 | 6/1993 | Machtig . |
| 5,278,596 | 1/1994 | Machtig . |
| 5,317,405 | 5/1994 | Kuriki et al. .............................. 348/20 |
| 5,407,391 | 4/1995 | Monroe et al. . |
| 5,619,254 | 4/1997 | McNelley .................................. 348/20 |
| 5,782,698 | 7/1998 | Keller ......................................... 472/61 |

OTHER PUBLICATIONS

3M "Optical Systems Light Control Film", date unknown.
Eyesaver International, Inc. "Private Eye", date unknown.

*Primary Examiner*—Safet Metjahic
*Assistant Examiner*—Christopher E. Mahoney
*Attorney, Agent, or Firm*—Graham & James LLP; Stefan J. Kirchanski

[57] ABSTRACT

An improved rear projection screen for projecting a three-dimensional head or face is designed to accurately match the apparent movement of a imaged person eyes to movements of an observer, thereby maintaining eye contact between the imaged person and the observer as the observer moves relative to the image. This unique effect called "visualactivity" enables either a recorded or a live image of a person to engage observers with eye contact in a natural and interpersonal way despite movement of the observers relative to the image. This effect is achieved by projecting an image onto the convex side of a rear projection screen that roughly has the shape of a human head and face but is configured with proportions that are different from the natural proportions of the imaged person's face. When viewed from the concave side, this combination produces a realistic human face that appears to turn to accurately track an observer's movements.

4 Claims, 7 Drawing Sheets

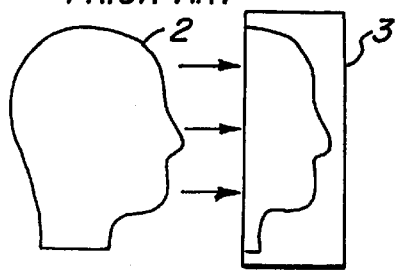
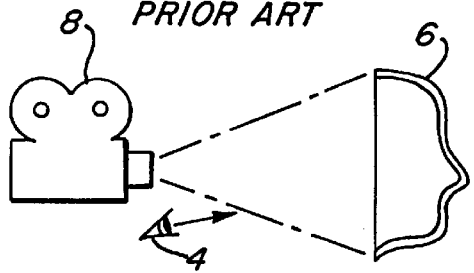
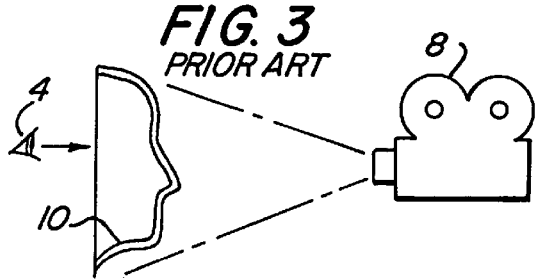
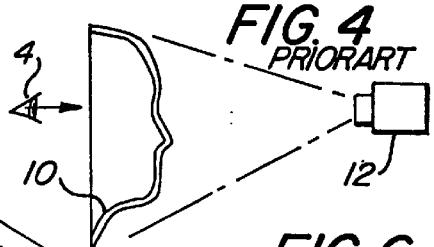
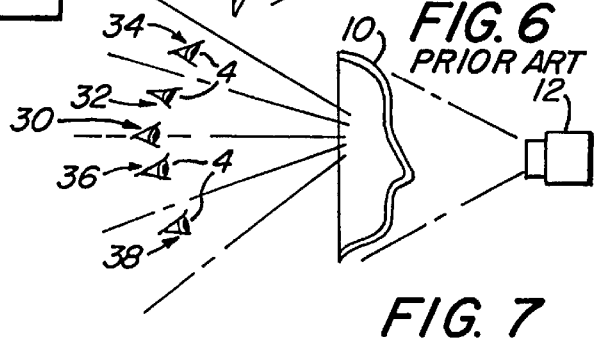
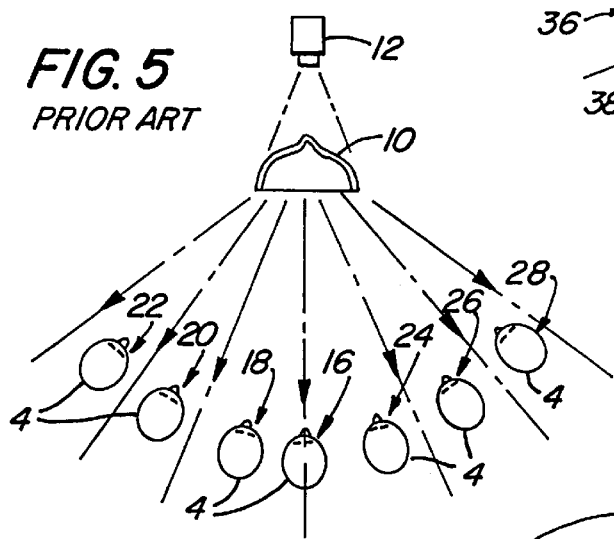
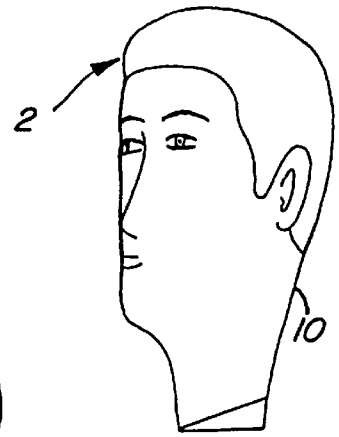
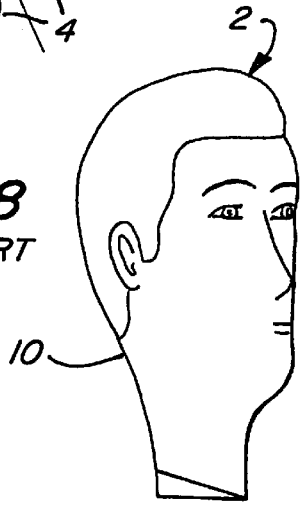

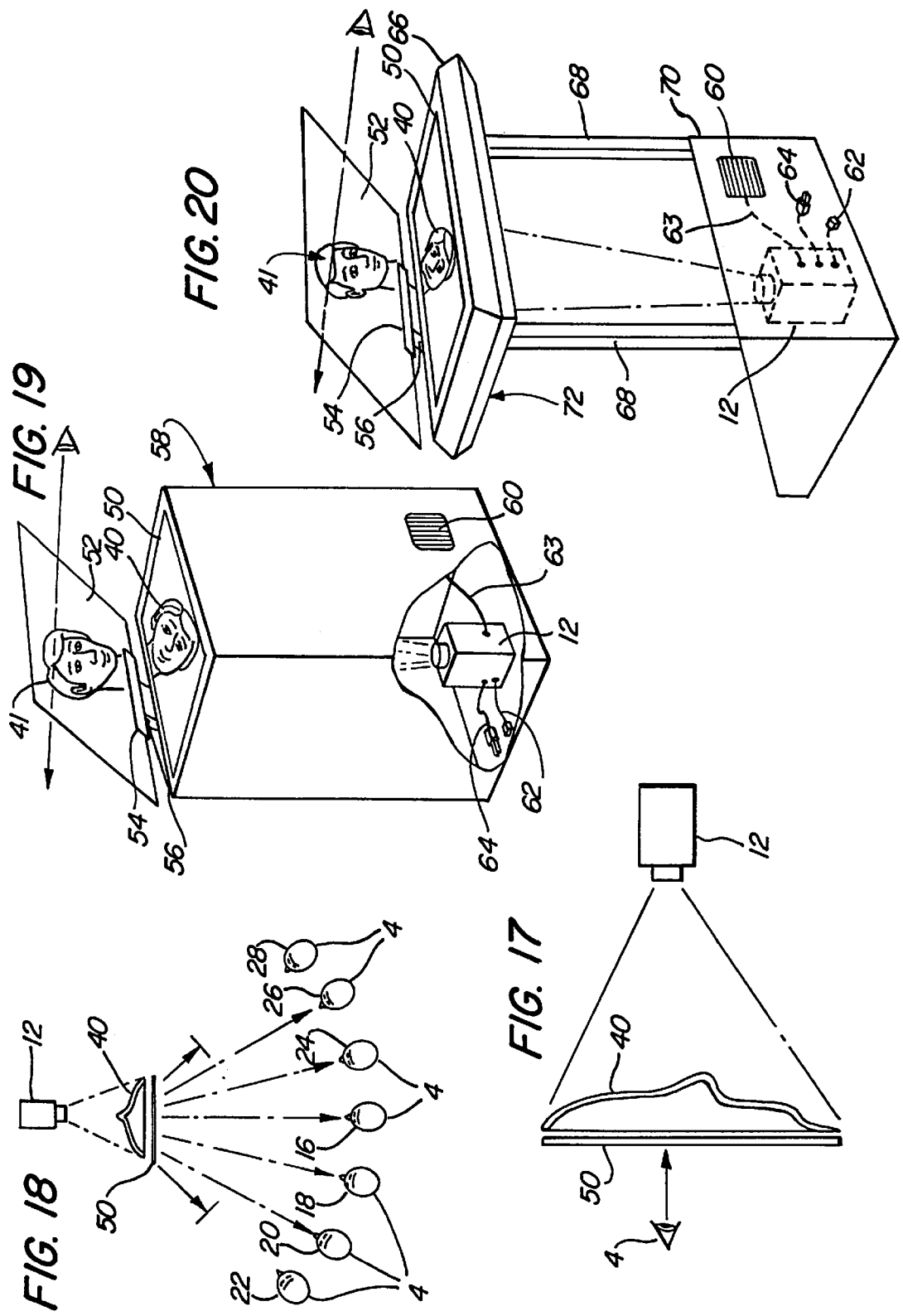

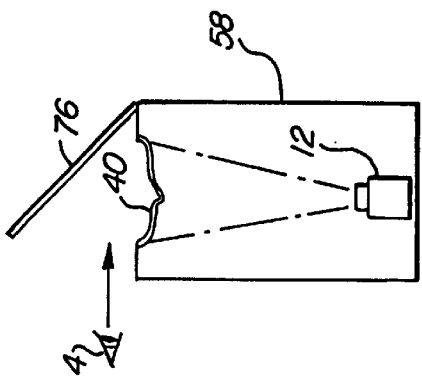
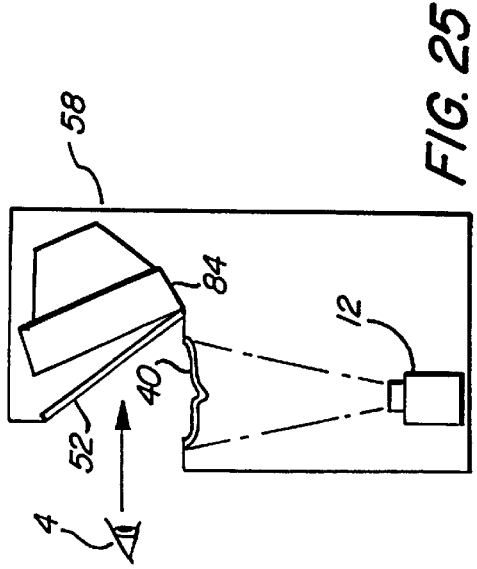
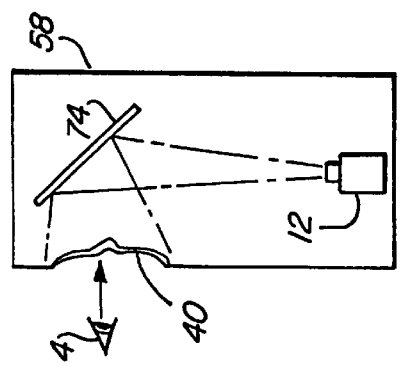
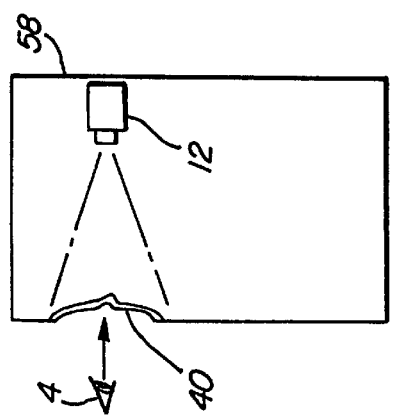
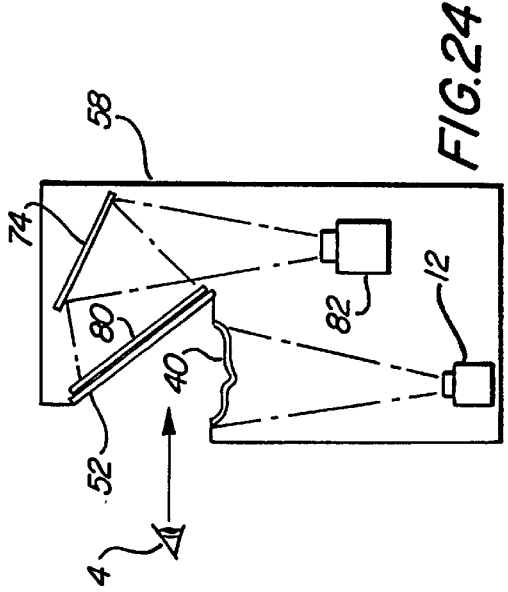

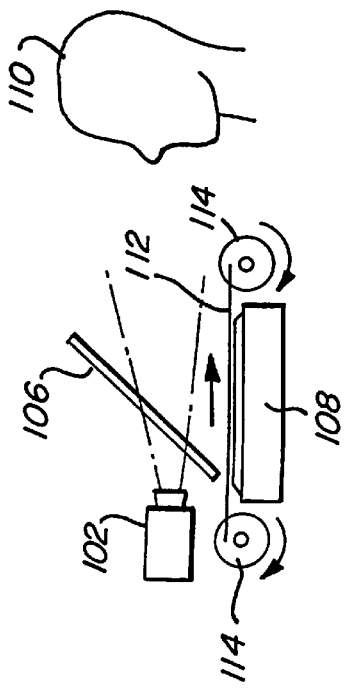
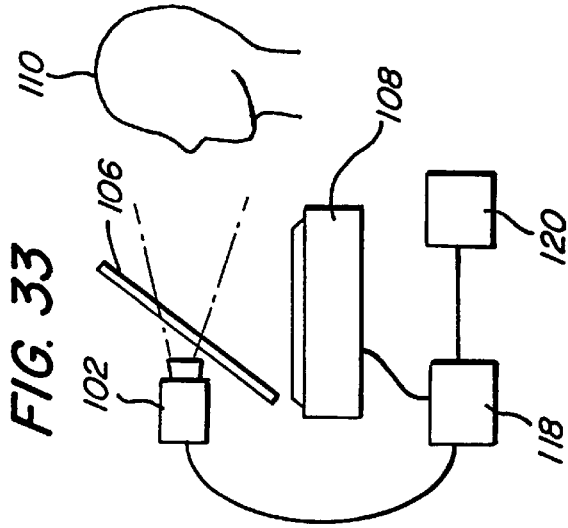
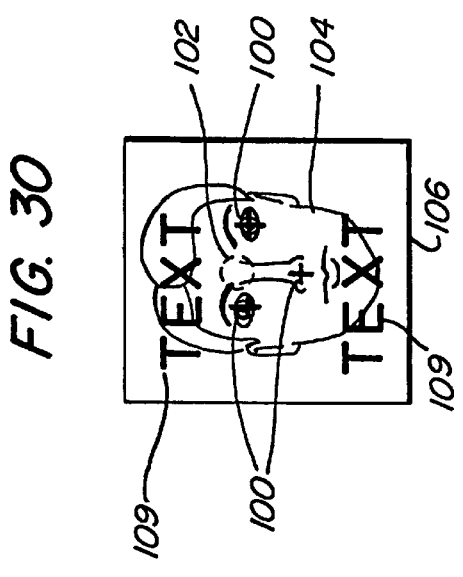
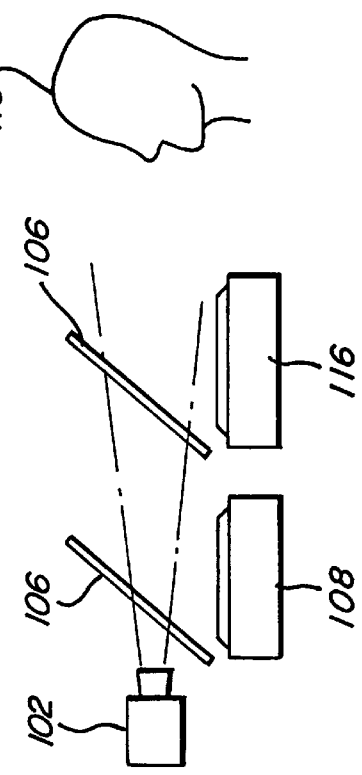

EYE CONTACT REAR SCREEN IMAGING

BACKGROUND OF THE INVENTION

1. Field of the Invention

The present invention is in the field of rear projection display systems and, more specifically, three-dimensional rear projection screens that are formed as a human face and projected onto a translucent convex surface to provide an illusion of an actual human face when viewed from a concave surface of the screen.

2. Description of Related Art

In recent years much attention has been given to transforming two-dimensional television and computer displays into more realistic three-dimensional displays. Although great strides have been made with certain types of three-dimensional displays, this type of display generally still lacks properties needed to actively engage an observer in a natural and personal way. Any three-dimensional illusion is rapidly destroyed as the observer moves about relative to the display because an image of the person imaged on the display, whether from a live or recorded source, fails to match the movements of the observer. For example, a newscaster should look straight ahead into the camera and thereby looks straight ahead towards the observer positioned directly before the display. This produces a sense of personal interaction because the newscaster appears to look directly at the observer. However, when the observer changes position, this sense of personal interaction is spoiled because the imaged newscaster fails to turn toward the observer in a natural manner. This lack of natural movement also retards natural conversation during video-conferencing because an image of a conferee does not follow a party conversing with the image.

The illusion of an actively moving head was probably originally observed in the negative impression of a person's face in a plaster mold. When one looks into a concave side of a mold of a human face, one observes a positive face, that is, an apparently concave image, which appears to turn as the observer moves from side to side before the concave mold. The illusion lacks nothing more than color and live action to create a unique sense of interpersonal engagement.

In the past a film projector in a front projection configuration has been used with some success to provide an illusion of full motion to a concave face screen. That is, a film of an actor's face can be projected onto a properly-shaped concave screen to provide a realistic illusion of a living face. These front-projected face screens have been used at several theme parks as parts of rides. The drawbacks of this front projection configuration are numerous. The viewing environment must be kept dark so that the projected image is not washed out by ambient light. Observers must be kept at a significant distance so as to not interfere with the projection beam. Also, distance helps reduce awareness of looking into the concave or negative side of the mold, thereby fostering the illusion that the observer is viewing a moving convex face.

A major drawback with this illusion is that accurate eye contact between the concave face image and the observer is not achieved. The head-shaped screen and especially the eyes, although configured to accurate human facial dimensions, appear to move more quickly than the observer's movements. The result is a lack of personal engagement because the imaged person is looking away rather than directly at the observer as that observer moves relative to the screen. This is no doubt a product of the optical illusion that produces an illusion of a concave rather than a convex image, and will be discussed below. Another drawback is that at the sides of the field of view the face image takes on a distorted and unnatural appearance which reveals the concave nature of the screen, thereby shattering the optical illusion.

In an attempt to resolve some of the drawbacks of the front projection face screen one of the instant inventors, Machtig, developed a rear projection face screen. A film projector and, later, an LCD (liquid crystal device) television projector, was used to project an image of a person onto the convex side of a diffused translucent face screen. When viewed from the concave side, an optical illusion of a living concave head was produced. This approach proved superior to the front projection method because observers could walk in front of the screen and not disturb the projected image. However, as with the front projection system, the illusion of accurate movement matched to that of the observer was not achieved with a screen configured to the natural dimensions of the human face. This lack of accurate movement also prevented eye contact. When the observer moved to the side, the image appeared to shift its gaze, but ended up looking away rather than directly at the observer. The illusion also suffered from deterioration when observed from the sides of the field of view, that is, beyond a viewing angle of about 15 degrees from the center. The imaged person appeared to be unnaturally distorted with part of the face cut off. Finally, while the rear projection technique permitted observers to view the concave face screen in close proximity because there was no disturbance to the projector beam, such close viewing allowed the observers to realize the concave shape of the screen, thereby destroying the illusion.

OBJECTS AND SUMMARY OF THE INVENTION

It is an object of the present invention to provide a three-dimensional rear projection face screen that, when viewed from the concave side, provides an illusion of face movement and eye movement ("visualactive" concave screen) so as to track an observer moving relative to the concave screen;

It is a further object of the present invention to provide a three-dimensional rear projection face screen that, when viewed from the concave side, provides apparent eye contact throughout the field of view with the face appearing to move independently of the eyes;

It is an additional object of the present to provide a means to conceal the concavity of the visualactive concave screen that might be apparent when viewed from the sides of the field of view;

It is a still further object of the present invention to further reduce the appearance that the visualactive concave screen is concave by reflecting the concave side of the screen from a beamsplitter;

It is yet another object of the present invention to combine a two-dimensional display with the visualactive concave screen reflected on a beamsplitter;

It is a further object of the present invention to provide a method and device to aid in positioning an actor to ensure alignment between a projected image of the actor and the visualactive concave screen;

It is a further object of the present invention to provide a method and device to provide a text script for an actor to read while also aiding in positioning the actor to ensure alignment between a projected image of the actor and the visualactive concave screen;

It is a further object of the present invention to enable a single projector to image both a visualactive concave screen and two-dimensional rear projection images; and It is lastly an object of the present invention to provide several visualactive terminal housing configurations including a housing that permits at least a part of the projector beam to travel through ambient light.

These and additional objects are met in a display technology that accurately matches the apparent movement of a imaged person's eyes to the movements of an observer. Eye contact is maintained between the imaged person and the observer as the observer moves relative to the image. This unique effect is referred to here by the inventors as "visualactivity." Visualactivity enables either a recorded or a live image of a person to engage observers with eye contact in a natural and interpersonal way even though the observers may move relative to the image. This effect is achieved by projecting a moving image from a projector such as an LCD projector onto the convex side of a rear projection screen that roughly has the shape of a human head and face but is configured with proportions that are fundamentally different from the natural proportions of the imaged person's face. When viewed from the concave side, this combination produces a realistic human face that appears to turn to accurately track an observer's movements. In an alternative embodiment the imaged face can appear to move independently of the direction of the face's eyes, which remain fixed on the observer to maintain eye contact. Visualactivity also includes maintaining the realism of the effect. To maintain the illusion, image blocking film can be applied between the viewer and the visualactive concave screen, thereby eliminating the distortion when the illusion is observed from the extreme sides. The image blocking film causes the image of the face to fade out when viewed from a predetermined angle on either side. Lastly, a beamsplitter may be provided to reflect the visualactive concave screen. Reflecting the visualactive concave screen reduces the screen's observable concave quality because a reflected image does not provide a absolute focal plane when viewing the reflected visualactive concave screen.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 illustrates a prior art plaster cast negative mold of the human face;

FIG. 2 illustrates a prior art film-based front projection system aimed upon the concave side of a human face screen;

FIG. 3 illustrates a prior art film-based rear projection system aimed upon the convex side of a human face rear projection face screen with intended viewer observation from the concave side;

FIG. 4 illustrates a prior art LCD-based rear projection system aimed upon the convex side of a human face rear projection face screen with intended viewer observation from the concave side;

FIG. 5 illustrates a prior art rear projection face screen and its inability to engage the viewer in the horizontal field of view;

FIG. 6 illustrates a prior art rear projection face screen and its inability to engage the viewer in the vertical field of view;

FIG. 7 illustrates the prior art distortion of the human face when configured into a rear projection screen and viewed from the left extreme side of the horizontal field of view;

FIG. 8 illustrates the prior art distortion of the human face when configured into a rear projection screen and viewed from the right extreme side of the horizontal field of view;

FIG. 17 illustrates a visualactive screen used with image blocking film;

FIG. 18 illustrates image cutoff when image blocking film is used between the visualactive screen and the viewer;

FIG. 19 illustrates the present invention configured with a housing and a beamsplitter;

FIG. 20 illustrates the present invention configured in an open air housing with a beamsplitter;

FIG. 21 illustrates a housing in which the viewer observes the visualactive screen directly;

FIG. 22 illustrates a housing in which the projector beam is reflected off a mirror;

FIG. 23 illustrates a housing in which the observer views the reflected image of the visualactive screen in a mirror;

FIG. 24 illustrates a housing with a rear projection screen disposed behind an observation side of the beamsplitter;

FIG. 25 illustrates a housing with a display monitor behind the observation side of the beamsplitter;

FIG. 30 illustrates combining a text prompter with an alignment image;

FIG. 31 illustrates an alignment image used with a transparent prompter scroll;

FIG. 32 illustrates an alignment image reflected from a beamsplitter used with a separate text prompter; and FIG. 33 illustrates combining an alignment image and computer-generated prompter signal by means of a video combining circuit.

DETAILED DESCRIPTION OF THE PREFERRED EMBODIMENTS

Figure 12:
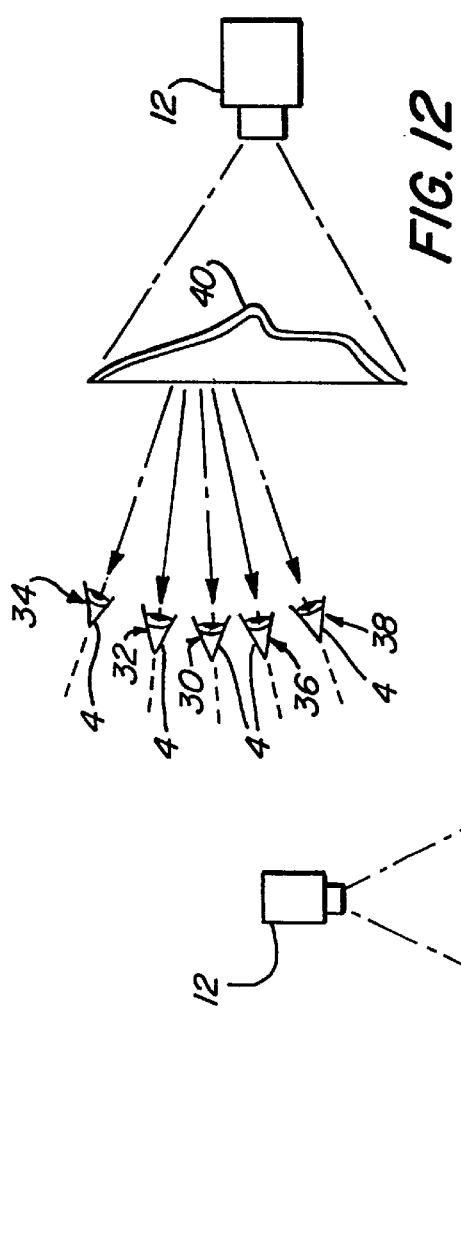
FIG. 12 illustrates a visualactive screen's ability to engage the viewer throughout the entire vertical field of view.

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a rear projection screen that produces an illusion that a viewer maintains eye contact with a projected image in spite of movement of the viewer relative to the screen.

Illusion of Concavity

As mentioned above, when a negative or concave surface of a mold of a human face is viewed, one, paradoxically, observes a concave image of the face. Because the present invention encompasses methods to improve this optical illusion, it is important to consider the illusion itself. Although the present inventors make no claim to fully understanding the psychological basis for the concave optical illusion, they have perfected methods to improve the illusion. It seems likely that the basic mechanism whereby a concave or negative relief of a face appears as a positive is related to the mechanism used by the human brain to interpret shadows as a three-dimensional object. That is to say, a two-dimensional image of a depression is instantly converted into three dimensions by the brain, provided that the image contains shadows (i.e., dark areas) produced by side illumination of the depression. A well-known but somewhat surprising aspect of this mental interpretation is that the apparent illumination of the depression influences the mental interpretation. Thus, if an image of the depression is inverted (i.e., turned 180 degrees), the depression will suddenly appear to be an elevation rather than a depression. This is particularly visible when inspecting a photograph of the moon. From one aspect the well-known craters appear as mounts, but if the photograph is inverted, they appear as depressions. This same phenomenon greatly influences the interpretation of aerial photographs. If a photo is held with the shadows extending towards the viewer ("shadows stab stomach" being the mnemonic phrase often used), the photographed objects will appear with correct three-dimensional appearance.

Thus, it is clear that the brain is somewhat prone to being deceived as it attempts to use shadows to produce spatial information. However, the human brain is very used to processing visual information about human faces, since a great deal of our vital interpersonal relationships depend on tiny nuances of facial representation. When presented with a negative or concave image of a face, the brain is loath to render the visual information provided by shadows as a face-shaped pit. Instead, the brain resolves the potential paradox by interpreting the concavity as a normal convex face.

Having decided that the concave face is actually a normal convex face, the brain strives to interpret any changes in the concave image in a way that is consistent with this decision. Consider a concave impression of a human face that is lighted somewhat from the side so that the depression is half shadowed. As explained above, this could represent either a depression or a nose-shaped elevation. The brain chooses to interpret this as an elevation, that is, as a nose. If the observer moves from side to side in relation to this concave nose, a different view of the concavity will be apparent. Moving to the right will make the left side of the concavity more visible, while the right side is less visible. This is exactly what one would expect when viewing a concavity, but the brain has already decided that the concavity actually represents an elevation.

When observing a nose-shaped elevation, moving to the right will cause the right side to become more visible while the left side becomes less visible. This, of course, is exactly the opposite of what happens with a concavity. The brain resolves this contradiction by interpreting the convex face illusion as having turned in the same direction that the observer has moved. This is because if the convex nose-shaped elevation were turned in that direction (i.e., towards the observer's right), the right side of the elevation will become less visible as the left side becomes more visible—exactly the effect of moving to the right of the concave depression. Therefore, when the observer gazes at the concave face from the right side of the concavity, the observer sees a convex face turned to the right. Similarly, if the observer gazes at the concave face from the left side of the concavity, the observer sees a convex face turned to the left.

FIG. 1 demonstrates the prior art process of taking a plaster mold 3 of a face of a subject 2. The plaster mold 3 copies the approximate proportions of the face of the subject 2. One prior art method (FIG. 2) uses a front projection face screen 6 of approximate facial proportions such as that of the face of the subject 2 of FIG. 1. A film projector 8 projects a face onto the front projection face screen 6. An observer 4 views the front projection face screen 6, and the observer's brain interprets the concave image as a convex face, as explained above. The basic three-dimensional form is provided by the concave screen 6 while the projected image adds details and movement. The brain fuses the two into a consistent image. The film projector 8 must be mounted away from possible interference of the projected beam by the observer 4 lest the illusion be destroyed.

FIG. 3 demonstrates a prior art rear projection arrangement where the film projector 8 projects a face image onto a rear projection face screen 10 made of translucent image dispersing screen material and configured to natural facial proportions such as that of the face of the subject 2 of FIG. 1. Here the observer 4 views the rear projection face screen 10 so that there is no possibility of interfering with the projected image, as is the case of the front projection arrangement of FIG. 2.

FIG. 4 illustrates the prior art rear projection arrangement that is configured and operates in a similar manner as the rear projection arrangement of FIG. 3. However, in this case an LCD projector is used to allow ease of maintenance and operation which is not possible with the film projector 8. Furthermore, use of an LCD projector allows a live image of a remote individual to be projected onto the screen 10.

FIG. 5 illustrates the prior art horizontal tracking characteristics common to the rear projection face screen 10 and the front projection face screen 6 (not shown) as explained above. Basically, the brain resolves the changes in the concave image seen by moving from side to side by presenting an illusion of a convex face turning from side to side. The rear projection face screen 10 is configured to mirror the proportions of the human face without consideration of resulting tracking characteristics as viewed by the observer 4. Although the observer 4 perceives the imaged face on the rear projection face screen 10 as roughly following the observer's movements throughout the horizontal field of view (i.e., from side to side), the observer 4 still does not enjoy the interpersonal connection of direct eye contact throughout that field of view. The observer 4 may perceive eye contact while directly in front of the rear projection face screen 10 when in position 16. However, as the observer 4 moves to the sides eye contact perception is lost. As the observer 4 moves to his left, eye contact is not achieved while in positions 18, 20, and 22. Likewise, as the observer 4 moves to his right, eye contact is not achieved while in positions 24, 26, and 28. Essentially, the observer 4 perceives the image as turning in response to the observer's motion. The image, however, appears to turn too far in either direction (i.e., seems to move ahead of the observer 4) to maintain eye contact in spite of the fact that the image is captured with the imaged person looking straight into a camera lens.

FIG. 6 illustrates the vertical tracking characteristics common to the prior art rear projection face screen 10 and the front projection face screen 6 (not shown). As explained above in terms of lateral movement of the observer 4, the brain resolves the image conflicts resulting from moving up or down relative to the concave screen 10 as a glancing up or down of a concave face. Again, the rear projection face screen 10 is configured to match the proportions of a human face without consideration to its vertical tracking characteristics as perceived by the observer 4. Although the observer 4 perceives the imaged face on the rear projection face screen 10 to follow movements throughout the vertical field of view, the observer 4 still does not enjoy the interpersonal connection of direct eye contact throughout that field of view. The observer 4 may perceive eye contact while directly in front of the rear projection face screen 10 when in a position 30. However, as the observer 4 moves up and down, eye contact perception is lost. As the observer 4 moves upward eye contact is lost while in position 32 and 34. Likewise, as the observer 4 moves downward eye contact is lost while in positions 36 and 38. Essentially, the observer 4 perceives the face as glancing upward or downward in response to the observer's movements, but the image appears to move ahead of the actual vertical position of the observer 4 in spite of the fact that the image is captured with the imaged person looking directly into the camera lens.

The present inventors believe that these and related problems can be understood by reference to their earlier explanation of the basis of the entire concave/convex head illusion. As already explained, changes in the view of a concave face caused by side to side movement of the observer 4 are resolved as an apparent turning of an illusory convex face. The depth and steepness of the sides of a concavity affect the extent of change in appearance caused by movement of the observer relative to the concavity. However, when an actual convex face turns, visual changes are related to how close a feature is to the observer 4 and the distance between the feature and the center of the head. If one imagines a turning head as a sphere turning on one of its radii (the neck), it is clear that the greater the distance from a feature to the center of the sphere the greater the distance that feature will travel as the sphere turns. Thus, a nose will show the greatest angular change while the sides of the head show less change. These relationships are not accurately maintained by the visual changes observed in moving relative to a concave replica of a human face. That is, a negative impression of a nose shows a visual change somewhat greater than a visual change resulting when a positive (convex) nose turns to match the observer's movement. This is particularly true of the sides of the head which, in a real turning head, show a relatively small change to the observer 4. However, with a concave face, the very steep sides of the head show a very large change as the observer moves relative to the concavity. The brain attempts to resolve these incongruities by producing a convex image that turns a great deal, resulting in a illusory concave face that always appears to gaze ahead of the observer's actual position.

This problem with optical shifts caused by moving relative to a concavity is even more troublesome at extreme edges. Prior art FIGS. 7 and 8 demonstrate the significant distortion caused in gazing into a concave-shaped screen near the screen's edges. When standing to the far left of the field of view the face screen 10 or the front projection face screen 6 (not shown), the observer 4 perceives a distortion wherein part of the face appears cut off as illustrated in FIG. 7. Likewise, when standing to the far right of the field of view the rear projection face screen 10 or the front projection face screen 6 (not shown), the observer 4 perceives a similar distortion wherein part of the face seems cut off as in FIG. 8. This distortion is caused when the brain attempts to resolve the optical shifts as a sharply turned face wherein the nose appears partially in profile. Obviously, a nose-shaped concavity cannot appear in profile, so the illusion collapses. Typically this cutoff distortion is observable beyond about 15 degrees on either side of looking directly into the middle of the concave face screen 10. From either side position this distortion greatly affects the realism of the face and also brings to the viewer's awareness that the face is actually concave and not convex.

The front projection face screen 6 of FIG. 2 and the rear projection face screen 10 of FIG. 3, when viewed at close distances, reveals the unnatural concave face shape rather than the natural convex shape of the human face because the observer's binocular ability to detect differences in depth overcomes the convex face illusion. At greater distances the binocular effect is less and the convex illusion predominates. What is gained in movement with these screens is lost in their apparent reverse dimensionality, which destroys the intended imitation of a lifelike person.

Detailed Description

Visualactive Dimensional Rear Screen Imaging

The present inventors discovered that by altering a concave screen away from natural proportions of a human face, it is possible to modulate the apparent turning motion of the resulting illusion so that precise eye contact tracking of the observer 4 can be maintained over a wide range of observer motion. Further, this modified concave face screen is much less prone to distortions that destroy the convex illusion. The solution perfected by the present inventors relies on altering the proportions of the concave face screen so that visual changes caused by movement of the observer 4 relative to the screen closely track the degree of change seen in various features when an actual concave face turns.

The nose should show the largest optical change since it is nearest the observer, the frontal portions of the face, i.e., the cheeks, mouth, and forehead show a lesser degree of change, and the ears and the extreme sides of the head still less of a change. A reasonable approximation of the desired results can be obtained by modulating these three "zones." More subtle effects may require separate control over the forehead, eyebrows, mouth, chin, and neck.

Figure 9:
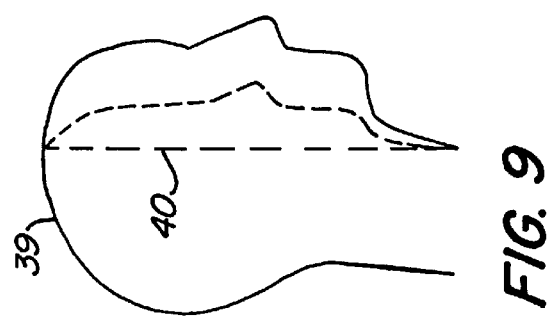
FIG. 9 illustrates a side view of the proportional quality of a visualactive concave screen of the present invention.
Figure 10:
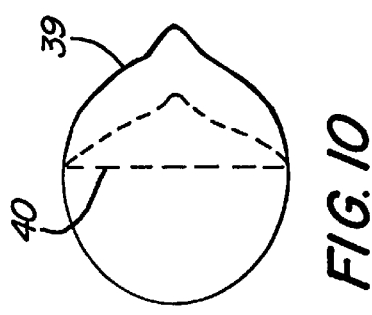
FIG. 10 illustrates a top view of the proportional quality of the visualactive concave screen of the present invention.

FIG. 9 illustrates a profile view of a shape of a visualactive screen 40 in relation to a sample human head 39. The visualactive quality of the visualactive screen 40 is defined as a rear projected image of a person by an LCD or similar functioning projector onto the convex side of a specially configured three-dimensional rear projection screen that, when observed from the concave side, appears to accurately maintain eye contact with an observer as that observer moves about in the field of view of a concave imaged face. As seen in FIG. 9 and as seen in the top view of FIG. 10, the visualactive screen 40 is configured with more shallow relief than the actual shape of the sample human head 39. The shallow concave shape is purposely designed not to copy the actual relief of the sample human head 39, but rather to support visualactive eye contact by correcting various distortions as detailed above. The visualactive screen 40 can be configured to create the visualactive effect with virtually all types of human head shapes other than the sample human head 39 which serves, for the sake of simplicity here, as an illustrative tool used only for comparison.

Figure 11:
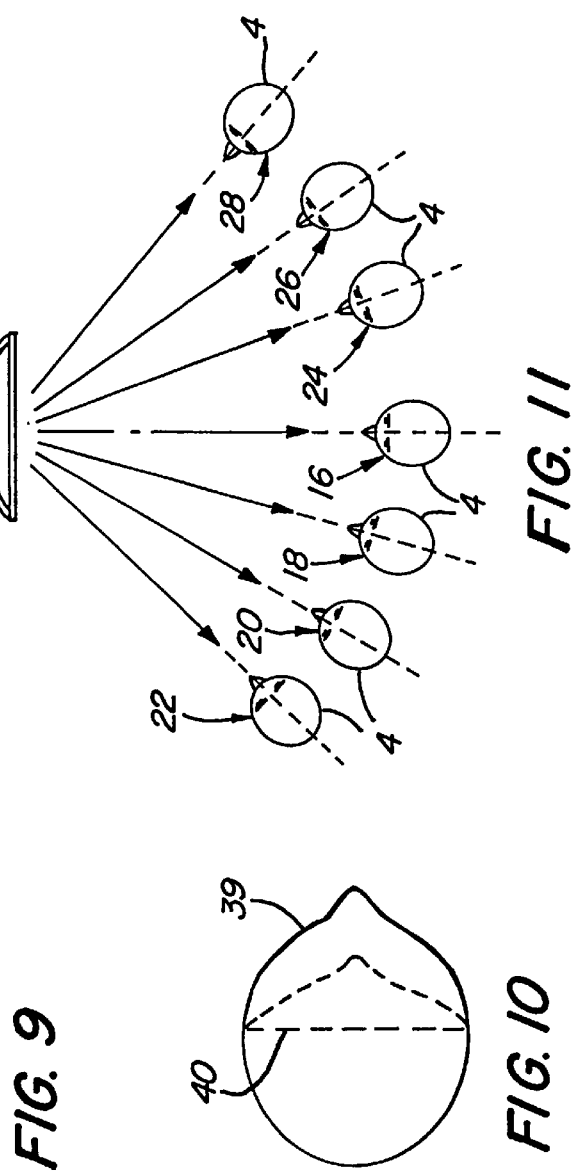
FIG. 11 illustrates a visualactive screen's ability to engage a viewer throughout the entire horizontal field of view.

FIG. 11 illustrates the visualactive screen 40 in operation with an image of a person projected from an LCD projector 12 onto the convex side of the visualactive screen 40. Other electronic projectors may be used as well, such as those made with Digital Micro Mirror Devices and Image Light Amplifiers. The visualactive screen 40 is translucent and sufficiently diffused to allow light to disperse on its surface, yet sufficiently transparent to allow the observer 4 to view that projected image on the concave side of the visualactive screen 40. The observer 4, when in a position 16, experiences apparent eye contact with a person imaged on the visualactive screen 40. As the observer 4 moves horizontally to the left into positions 18, 20, and 22 and to the right into positions 24, 26, and 28 eye contact and the sense of interpersonal engagement is maintained throughout the field of view. To the observer 4 it appears that the person imaged on the visualactive screen 40 smoothly turns to maintain eye contact. Likewise, observer 4 maintains eye contact throughout the vertical field of view as seen in FIG. 12. The observer 4 experiences eye contact with the person imaged on the visualactive screen not only in a position 30, but also upward in positions 32 and 34 and downward in positions 36 and 38 as long as the image is captured with the person imaged looking directly into the camera lens.

The visualactive screen 40 is also able to largely eliminate the distortion of the cut off face as shown in FIGS. 7 and 8. Since the visualactive screen 40 is much more shallow than the prior art rear projection face screen 10, the distortion free field of view is widened to as much as 140 degrees, depending on the depth of the visualactive screen 40.

Figure 13:
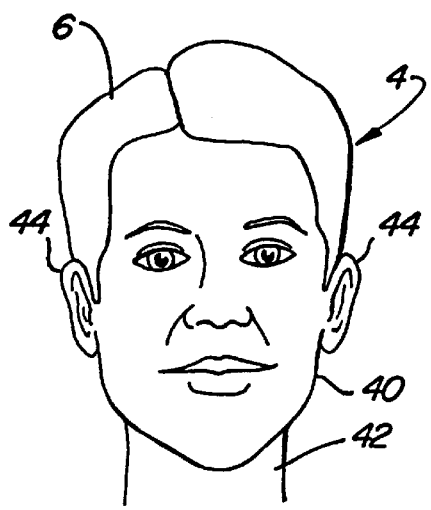
FIG. 13 illustrates a visualactive screen configured with hair, ears and neck.

FIG. 13 illustrates a person 41 imaged on the visualactive screen 40. Not only can facial features be configured and supported by the visualactive screen 40, but also, other features such as hair 46, ears 44, and neck 42. These elements, as well as other elements, such as shoulders, torso, and complete body (not shown) may be integral with the visualactive screen 40.

Figure 14:
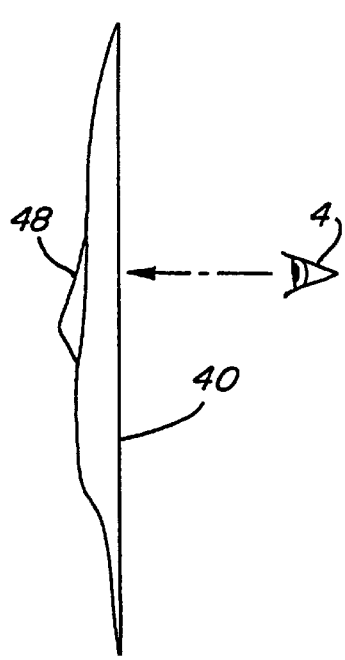
FIG. 14 illustrates a visualactive screen that is configured for similar head and eye movement.

FIG. 14 illustrates a side view of the visualactive screen 40 configured with an extremely shallow screen depth (ratio of nose depth to screen height of about 0.06). Approximate depth measurements of this visualactive screen are shown in Table 1. This screen is larger than life with a height of about 17 ½ inches. It will be apparent to one of ordinary skill in the art that the measurements provided in Table 1 can be used to produce screens of virtually any size as long as the proportion of the screen depth to screen height is maintained. The nose area is still the deepest, but is less deep than an actual negative nose impression. The frontal portions of the face are rather more broad and show less relief than an actual face impression. Finally, the sides of the face are shallower with a greater radius of curvature than in an actual head impression. This extremely shallow screen permits eye contact with the observer 4 throughout the field of view and produces an illusion of the head itself turning in the same direction that the observer 4 moves. Various features such as the eyebrows, cheek bones, etc. may be added into the subtle relief of this extremely shallow configuration.

TABLE 1

| Feature | Depth in inches |
| --- | --- |
| Forehead | ¼ |
| Brow | ¼ |
| Iris of eye | ¾ |
| Nose | 1 |
| Mouth | ⅜ |
| Neck | 3⁄16 |

Figure 15:
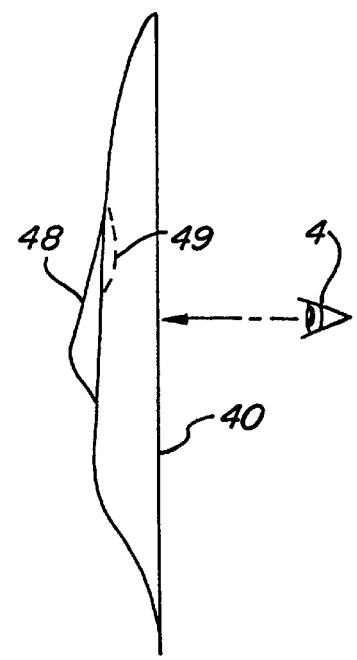
FIG. 15 illustrates a visualactive screen that is configured for eye movement that is independent of the movement of the head.

An alternative embodiment of the visualactive screen creates an illusion that various image elements appear to respond independently to movement of the observer 4 relative to that screen. FIG. 15 illustrates a visualactive screen 440 configured with a greater depth (ratio of nose depth to screen height of about 0.12) than the screen illustrated in FIG. 14. For this example the visualactive screen 440 is 17½ inches tall with a depth of approximately 2 inches at the deepest point in the nose 48. Table 2 presents approximate depth measurements of various features in this screen.

TABLE 2

| Feature | Depth in inches |
| --- | --- |
| Hair | ½ |
| Forehead | 1-¾ |
| Brow | 1-⅝ |
| Nose | 2 |
| Base of Convex Eye Region | 1-⅜ |
| Peak of Convex Eye Region | 1-¼ |
| Mouth | 1-⅞ |
| Chin | 1-⅞ |
| Neck | 1 |

The visualactive screen 440 of FIG. 15, with this deeper configuration, results in the appearance that the head moves more quickly in the observer field of view. Hence, when viewed from a side of the screen 440, the imaged head appears directed somewhat to the side rather than facing directly toward the observer. This apparently increased speed of movement creates more dynamic movement of the head than is realized in the configuration of FIG. 14. This dynamic head movement improves the ability of the visualactive screen 440 to engage the interest of the observer 4. Eye contact is maintained with this configuration of the visualactive screen 40 by forming in the screen two convex eye regions 49 where the imaged eyes are located. The convex eye regions 49 permit the illusion that the eyes are looking toward the observer even when the head is facing slightly away from observer 4. The convex eye regions 49 generally extend minimally over a portion of the iris, but may be enlarged to cover the whites and even the eyelids. The inventors have found that the smaller convex region 49, generally covering the iris, provides the optimum illusion of eye contact. Since the face and the eyes are at different distances from the observer 4, the face appears to move independently of the eyes which remain continuously fixed upon the observer 4 to maintain eye contact. This alternative embodiment visualactive screen 440 is interchangeable in all configurations and applications with the earlier-described embodiment visualactive screen 40 which lacks convex eye regions 49.

Figure 16:
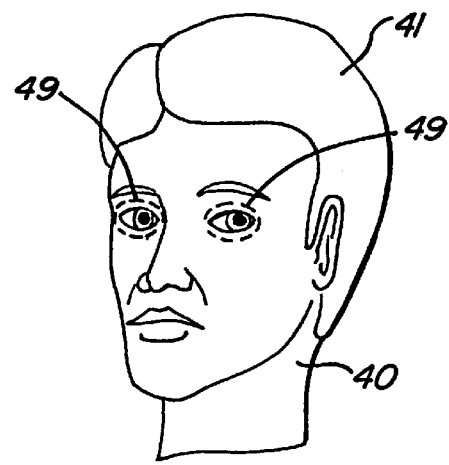
FIG. 16 illustrates a visualactive screen that maintains eye contact throughout the field of view and a head that faces away rather than at the observer when viewed from the sides of the field of view.

FIG. 16 illustrates the appearance of the imaged person 41 with convex eye regions 49 as viewed from the left side of the screen 440. This eye contact effect is also maintained when the screen 440 is observed from the right edge, except that the imaged person 41 would appear to be facing to the right (not shown). Various other facial features may also be configured with subtle convex or concave dimensionality to produce a "layered" movement effect. The general principal, as explained above, is that increases in concavity support the appearance of more rapid and extreme movement, while decreases in concavity (i.e., convexity) support the appearance of slower and less extreme movement.

The visualactive screen 40 may be produced smaller-than-life, lifelike, or larger-than-life as long as the three-dimensional relief remains proportional to the screen dimensions. Also, depth-to-height ratios other than the previous examples have been demonstrated to produce successful eye contact throughout the field of view. While a special screen can be produced to exactly match the facial features of an imaged person, one particular screen has proven to be applicable to a variety of face shapes. Thus, a "generic" screen, although not ideally suited for the extremes of diverse face shapes, has proven adequate for use as a video-teleconferencing display where each new caller's face shape is unpredictable.

To enhance the quality of visualactivity the concave shape is preferably not distinguishable by the observer 4. As mentioned above, close approach to the screen or observations from the extreme sides of the field of view can destroy the illusion. The appearance of the imaged person will, at a point depending upon the depth of the screen, become distorted (see FIGS. 7 and 8). FIG. 17 illustrates the application of an image blocking film 50 between the observer 4 and the visualactive screen 40. Essentially, the image blocking film 50 is a material that affects the transmission of an image when viewed at or beyond some critical angle, usually 45 degrees on either side of a central viewing position. Adjustments to permit either a wider or narrower field of view may be to fit the optimum viewing radius of a particular visualactive concave screen 40 or normal concave screen 10 by selecting an appropriate type of the image blocking film. The image blocking film 50 is capable of either entirely blocking light transmission or of diffusing a transmitted image, depending on the exact type of image blocking film employed.

The image blocking film 50 is available from several sources and can be based on several different technologies. Whether of plastic or glass, the image blocking 50, film as it is presented here, is a material that permits transmission of light from at least one direction and reduces or eliminates light transmission from at least one direction. Eyesaver International Inc. produces an image blocking film named "Private Eye" that diffuses light from various directions. From the perspective of the observer 4, when using this film, light directly from the visualactive screen 40 appears diffused eliminating the focused image. The diffused light, even though visible to the observer 4, adequately conceals the image.

Another type of image blocking film made by 3M Inc. is named "Light Control Film" and is preferred, because it can eliminate virtually all light transmission from a desired direction. This particular image blocking film 50 contains closely-spaced black microlouvers and is available with a wide selection of louver angles, and even more options can be created by layering several films.

FIG. 18 demonstrates the functioning of the image blocking film 50. The observer 4 enjoys visualactivity from positions 20, 18, 16, 24, and 26. However, at the extreme sides of the field of view, in positions 22 and 28, the visualactive screen 40 and the imaged person disappears as the image blocking film 50 blocks light transmission at those angles of view. The extreme angle distortion is, as a result, hidden from the observer 4 so that the concave shape of the screen is not revealed. The disappearance and reappearance of the visualactive screen 40 and the imaged person 41 creates a defined viewing boundary for the observer 4. This boundary may be altered depending upon selection of the type of the image blocking film and its characteristics.

The image blocking film 50, though shown in use with the visualactive screen 40 in FIGS. 17 and 18, is a particularly necessary improvement for the rear projection face screen 10 because of the depth and resulting field of view distortion of that type of concave screen. The image blocking film 50 is applicable to rear projection dimensional screens in general, especially when the intended viewing surface is concave. Even with convex viewing surfaces the image blocking film 40 causes an improvement in the illusion. When these screens are viewed from extreme angles, there is often a marked fall-off in the brightness of the projection. As the projected image becomes dim, the existence of the screen becomes apparent, thereby ruining the illusion.

An additional aspect of the present invention greatly improves upon the realism of the imaged person projected on a concave screen. FIG. 19 illustrates the use of a beamsplitter 52, a partially transparent-partially reflective surface, as a reflective substrate which aids in concealing the concave shape of the visualactive screen 40 or any type of concave screen such as the rear projection face screen 10 of FIG. 4. The visualactive screen 40 is reflected from the transparent beamsplitter 52 so that the observer's perception of the concave shape of the visualactive screen is reduced by a somewhat transparent focal plane. The transparent focal plane makes it more difficult to focus on and perceive the concavity of the visualactive screen 40.

Those in the optical coating art will understand the wide variations possible for the beamsplitter 52 in regards to its substrate, coating, and manufactured process. Both plastic and glass substrates, as well as stretched mylar, have been used for the beamsplitter 52. Reflective coating of the beamsplitter 52 can range from custom blends of various metals for superior reflectivity and transmissivity all the way down to off-the-shelf one-way mirrors and films with less consistent and poorer optical qualities. Also, the reflectivity and transmissivity, as well as other optical qualities, of the beamsplitter 52 can be adjusted as needed. Despite these wide variations of the beamsplitter 52, the property of being both reflective and transparent remains the single most important constant.

Antireflective coatings can be applied as needed. On the back side of the beamsplitter 52, opposite the reflecting surface, an antireflection coating serves to eliminate the ghosting effect apparent with many types of beamsplitters. Also, antireflective coatings can be applied on top of the image blocking film 50 when it is necessary to reduce an image reflected from the beamsplitter 52 back onto the image blocking film 50.

FIG. 19 illustrates an enclosed housing 58 consisting of a rectangularly-shaped box. The enclosed housing 58 contains the LCD projector 12 aimed straight up onto the visualactive screen 40. The LCD projector is powered through power plug 64, receives an image and audio signal by cable 62, and sends an audio signal to speaker 60 by a speaker wire 63. Layered on top of the visualactive screen 40 is the image blocking film 50. The beamsplitter 52 is held in place by a positionable hinge mount 56 with a grooved frame 54 which holds the beamsplitter 52 in place. The positionable hinge mount 56 is bolted (not shown) to the enclosed housing 58. The beamsplitter 52 is shown reflecting the imaged person 41 from the visualactive screen 40.

FIG. 20 illustrates an open air housing 72 of the present invention, the open air housing 72 has the advantages of allowing the design of streamlined aesthetics, reduced bulk and weight, as well as collapsibility. The open air housing 72 consists of a base 70, extension posts 68, and a screen pod 66. The base 70 contains the LCD projector 12 with power plug 64, image and audio cable 62, and speaker wire 63 attached to speaker 60. A light beam from LCD projector 12 passes through a hole (not shown) in base 70 to the visualactive screen 40 contained in screen pod 66. Layered on top of the visualactive screen 40 is the image blocking film 50. Attached by a bolt (not shown) is the positionable hinge mount 56 with the grooved frame 54 which holds in place the beamsplitter 52. The open air housing 72 may be collapsed for storage and travel purposes by removing extension posts 68 from receiving slots (not shown) in base 70 and the screen pod 66. The beamsplitter 52 is shown reflecting the imaged person 41 from the visualactive screen 40.

The construction of one of the various configurations of the present invention is delineated herein so that skilled persons can fabricate it in the manner the inventors have undertaken. A housing was constructed according to the rectangular shape of the enclosed housing 58 of FIG. 17. The housing consists of four walls, a base, and an open top with two-inch molding to allow the visualactive screen to be supported by its edges. The housing 58 was made of laminated plywood and fastened by nails and screws. A hinged door was provided so that access to the interior was possible from below. Inside the housing was mounted a SHARP LCD P-15 projector aimed upward in the direction of the visualactive screen which had been placed in the top opening of the housing. A frame of aluminum was constructed to hold the projector in place. Holes were drilled in bottom of the housing and covered with an open weaved black material for ventilation and to allow the projector's built-in speakers to be heard.

The beamsplitter was mounted in a manner similar to that shown in FIG. 19. The mounting plate and frame were custom fabricated out of steel. This piece was screwed into the housing wall in the back. A 27-inch by 35-inch beamsplitter was fitted into the frame at approximately a 45-degree angle to the imaging surface. The beamsplitter used was 40% reflective and 60% transmissive titanium-coated float glass available from a variety of vacuum coating companies. The reflective side was aimed downward toward the screen and, on the opposite side, an antireflection coating was applied to eliminate possible ghosting of the image.

Image blocking film, 3M Inc. Light Control Film (ABRO OB90 CLR.030), was layered on top of the visualactive screen to cut the image off at extreme angles. The light control film used permits a viewing radius of around 90 degrees. The film sheet was layered between two $\frac{1}{8}$-inch sheets of clear acrylic to protect it from scratching.

The visualactive screen was configured for visualactive characteristics and was made larger than the actual human head. In all, the dimensional part of screen from side to side was 12 inches and from top to bottom was 17½ inches. The total depth of the concave-shaped screen, at its greatest depth at the nose, was two inches (see Table 2 for additional measurements). The eyes were convex-shaped from the observer's point of view so that eye contact was maintained throughout the field, yet the head itself would track at a slightly faster pace as the observer 4 moved.

The specific dimensionality and feature quality was determined by one of two methods. The first is the use of projected assisted sculpting in which the image of a person is projected onto a slab of clay. That clay is then sculpted until the desired visualactive result is achieved. When completed a plaster positive is casted and from that a resin vacuum-form tool is made. The second method used consisted of retrieving dimensional facial information of a specific human head with a Cyberware 3030 R 3-D digitizer. That shape data is then manipulated with a computer and used to operate a Servo Products 3000 milling machine to produce test pieces from 10-pound urethane foam. The test pieces are verified by being projected into to determine the visualactive results. Modifications are made and a final part is milled, sanded, and used as vacuum-form tool.

Various commercial grade grey matte rear screen materials were then vacuum formed. Clear PETG plastic $\frac{1}{32}$-inch thick has also been used as screen, then frosted and dyed neutral grey for color balance and improved resolution. Any optically clear, thermoplastic resin such as acrylics, polycarbonates, or vinyls would be equally suitable. The screen was then mounted to a frame with the image blocking film and then attached by screws at the edges of the housing top. Vacuuming forming is the preferred screen fabrication method, but other plastic fabrication methods such as casting into two-part molds may, as well, prove adequate.

Standard broadcast quality production techniques were used to create the recorded imaged person. During the production the actor remained still so that his image would not shift on the screen. Also, near continuous viewing into the camera lens by the actor assured visualactive eye contact with observers when projected on the visualactive screen. The same actor was used in a live broadcast to establish the usefulness of the technology as a video-teleconferencing display and for other live broadcast purposes.

A unique production problem in producing video recordings for use with the present invention is enabling a performer to view his or her own image while looking straight into the lens of a camera and at the same time reading text that is to be spoken. The use of text "prompters" such as cue cards is well known in the art of motion picture production. For situations where an actor is to look straight at a camera while speaking lines, as in the case of a newscaster, various beamsplitter and projection devices have been perfected such as the ubiquitous teleprompter. The solution adopted by the present inventors is to capture the performer's image through a beamsplitter onto which is reflected the performer's own electronic image provided by an image display. The reflected electronic image is marked by alignment lines (such as china markers, tape, or computer graphics) which provide visual cues enabling the performer to align himself or herself within an image frame, thereby ensuring proper registration when the image is ultimately projected onto the visual-active screen 40 of the present invention. To also provide prompting for spoken lines, text may be added to the reflected electronic image by one of the techniques described below.

FIG. 30 illustrates an electronic self-image 104 seen by an actor 110 as he looks at himself into a beamsplitter 106. Alignment marks 100 allow the actor to align himself while reading text 109. A camera 102 is positioned behind the beamsplitter 106 at eye level. The combination of the actor's image 104 with prompting text 109 is accomplished by one of several methods. In FIG. 31 a monitor 108 connected with the camera 102 provides the actor's image 104 to the beamsplitter 106. The alignment marks 100 are drawn on the monitor 108. Text 109 is written on a long strip of transparent material which is wound onto rollers 114 and scrolled over the monitor 108 while the actor says his lines. FIG. 32 shows an alternative arrangement wherein the text 109 is provided by a separate computer-controlled screen 116 with its own beamsplitter 106. The actor 110 looks through two beamsplitters 106 to see both the prompting text 109 and his own image 104. This arrangement has the drawback that the camera 102 must capture an image through two rather than one beamsplitter 106. This problem is solved in FIG. 33 where an electronic unit 118 superimposes text from a prompting computer 120 on image data from the camera 102. Of course, the electronic unit 118 can comprise any of a number of electronic signal combiners such as a dissolve switching unit.

FIG. 21 illustrates the present invention configured into an enclosed housing 58 similar to that of FIG. 19. However, instead of the observer viewing the reflection of the visualactive screen 40 on beamsplitter 52, the observer 4 views the visualactive screen 40 directly. FIG. 22 illustrates the use of a projection mirror 74 that enables a projection beam from LCD projector 12 to change direction, affording the flexibility of a more compact enclosed housing 58. FIG. 23 illustrates another configuration that reduces the size of the enclosed housing 58. The image from the visualactive screen 40 is seen in the reflection of a mirror 76. Though the mirror 76 does not have the beneficial properties of the beamsplitter 52 previously described, it does offer flexibility of housing design. Mirror 76 can be a standard type mirror, but it is preferred that it be a front surface-enhanced mirror for improved reflection.

It may be advantages to overlay a two-dimensional image with a visualactive image for certain display purposes. For example, an imaged person on the visualactive screen 40 could appear and narrate a video segment, then disappear and a standard two-dimensional screen could play from apparently the same screen. The inventors have devised a unique display system in which a visualactive screen 40 is reflected from a beamsplitter 52 with a rear projection screen mounted behind the beamsplitter 52. FIG. 24 illustrates a rear projector 82, such as an LCD projector, that reflects a projected image from the mirror 74 optional in some housing designs) to a rear projection screen 80. Rear projection screen 80 may be any type of rear projection screen material such as a fresnel lenticular screen. In this arrangement the image reflection from the visualactive screen 40 and the image on the rear projection screen 80 can appear simultaneously or independently. FIG. 25 illustrates a similar configuration as seen in FIG. 23 except that a monitor 84 such as a CRT is used instead of the rear projector 82 and the rear projection screen 80.

Figure 26:
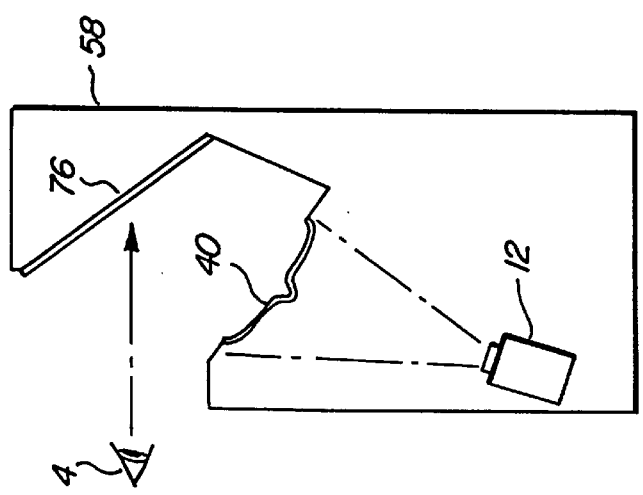
FIG. 26 illustrates a housing configured with the visualactive screen positioned at an angle so that the screen cannot be viewed directly by the observer.

A distraction may occur when viewing the reflection of the visualactive screen 40 on the mirror 76 because the observer 4 has his attention divided by being able to view both the visualactive screen 40 and, at the same time, the reflection on mirror 76. FIG. 26 offers a well-known way to resolve this problem, which is used often in video game terminals to hide a two-dimensional screen. Here, the visualactive screen 40 is positioned at an angle sloping downward so that it is concealed from the observer point of view. This same solution may be applied when reflecting an image upon the beamsplitter 52 (not shown). The drawback of this arrangement is that the enclosed housing 58 most likely will need to be configured with greater bulk to accommodate the angled positioning of LCD projector 12.

Figure 27:
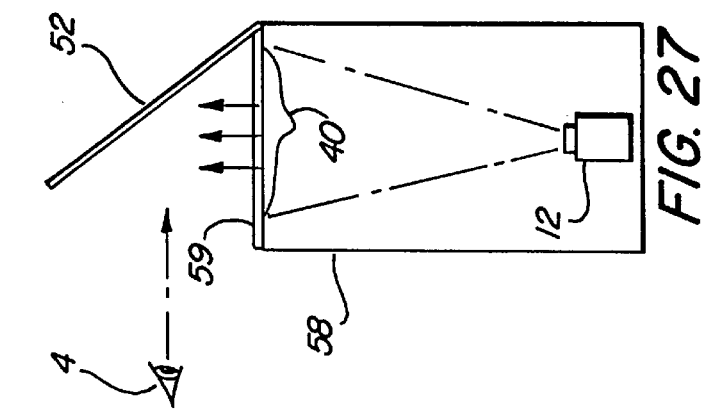
FIG. 27 illustrates a housing with image blocking film that conceals the visualactive screen from direct view by the observer.

The inventors have also developed an original approach to ensure housing bulk can remain at a minimum, yet still shield the direct image from the visualactive screen 40 from the observer point view. FIG. 27 applies front view image blocking film 59 on top of the visualactive screen 40. As previously described, image blocking film can block out light from a visualactive screen 40 entirely from one direction, yet permit light from that visualactive screen 40 to pass through at another direction. In this case the observer 4 cannot look directly into the visualactive screen 40, yet can still enjoy its reflection on the beamsplitter 52 or on mirror 76 (not shown).

Figure 28:
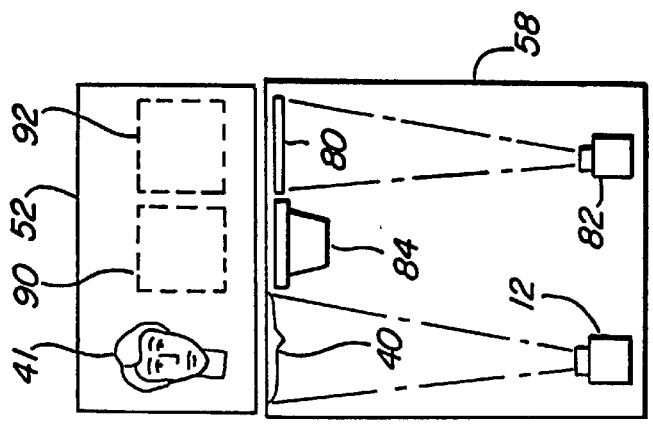
FIG. 28 illustrates a housing that reflects additional images on the beamsplitter.

Another configuration of the present invention is seen in FIG. 28. Here the visualactive screen 40 is reflected onto the beamsplitter 52, but additional images share the beamsplitter 52 reflection. Monitor 84 and rear projector 82 with rear projection screen 80 can both share or can independently use the beamsplitter 52, giving the appearance that their images are floating next to the imaged person 41 on the visualactive screen 40. Mirror 76 can also be used with shared image reflections (not shown).

Figure 29:
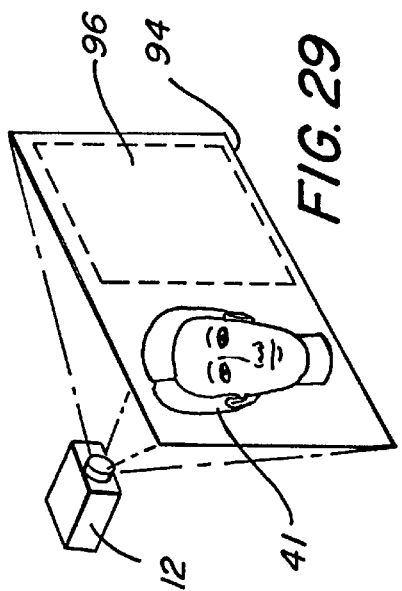
FIG. 29 illustrates the visualactive screen and two-dimensional display both imaged by the same projector.

Lastly, the inventors have demonstrated a single substrate rear projection screen 94 that contains both an area for a two-dimensional image 96 and a three-dimensional visualactive area to receive the imaged person 39 as seen in FIG. 29. Although shown with one LCD projector 12 being responsible for creating both images, additional projectors (not shown) may be used to create one or part of an image.

Although not expressly shown, those skilled in the art will appreciate that the devices of FIGS. 21–29 may be configured with an open air housing type design as seen in FIG. 20 for collapsing and aesthetic purposes. FIGS. 21–29 may also include the image blocking film 50 as taught in FIGS. 17 and 18. Additional mirrors commonly used for redirecting the projection beam to reduce the housing size will, as well, be apparent to those skilled in rear projection systems.

The image source for the present invention can consist of a variety of types of recording and playback devices. The inventors prefer CD-I (compact disc interactive, a format providing compressed video signals on a compact disc) and all of its capabilities as a recording and playback source. The image signal may also be transmitted as a broadcast terminal. Both recorded images and live images may be displayed on such a terminal. The inventors intend to use the present invention as a video-teleconferencing display, permitting a local conferee to view a distant conferee. The beamsplitter 52 is ideally suited for this purpose because a camera can be mounted behind it and aimed through it so that an eye level image can be captured of the local conferee for transmission and viewing by the distant conferee.

Because the visualactive screen 40 is reflected on the beamsplitter 52, the image will appear to be reversed (this is true also when reflecting an image on mirror 76). Image reversal techniques are a standard feature on many projectors and can easily remedy this problem by appropriately reversing the image before it is displayed. Thereby, when rear projected and reflected on the beamsplitter 52 or mirror 76, the image will assume its correct viewing image.

When viewing the reflection of the visualactive screen 40 from the sides, the reflection of the visualactive screen 40 may appear to fall off the edge of the beamsplitter 52 (and mirror 76) when the image is the same size as the visualactive screen 40. A simple remedy for this problem is to make the beamsplitter 52 as large as necessary, so that the entire image remains reflected even when viewed from the sides.

Additional components may be included as desired to the various embodiments of the present invention. Stereo speakers, accompanying three-dimensional displays, teleconferencing components such as a microphone, lights, camera, signal compression and decompression systems, network access, and reception, to name only a few. Also, the visualactive screen 40 may be used as a type of computer monitor, requiring supportive hardware for that application. Tracking techniques may be employed during the production or live broadcast so that the imaged person may move about with a certain degree of freedom yet remain centered in the image.

Finally, the two-dimensional image on the visualactive screen 40 may be improved by the application of any of a number of three-dimensional depth enhancing processes either during image capture, projection or screen display such as a process from 3-D America (Burbank, Calif.).

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A rear projection apparatus for providing an illusion that a three dimensional face imaged on a screen maintains eye contact with an observer located at any position across a horizontal and vertical field of view of the rear projection apparatus, the rear projection apparatus comprising:

a projector for projecting an image;

a rigid translucent screen forming a shallow cavity representing a negative, reduced three dimensional contour of features of a face with a maximum diameter of the cavity representing a height of the face and a maximum depth of the cavity representing a nose of the face and having a rear convex surface for receiving the image from the projector so that the image can be viewed from a front concave surface of the screen by the observer located in the horizontal and the vertical field of view;

and eye portions of the rigid translucent screen which are convex as compared to the front concave surface.

2. The rear projection apparatus of claim 1, wherein additional images appear along side the rigid translucent screen.

3. The rear projection apparatus of claim 1, wherein a layer of image blocking film is disposed between the rigid translucent screen and the observer to limit the observer's ability to view the rigid translucent screen from oblique angles.

4. The rear projection apparatus of claim 1, wherein a semireflective beamsplitter is disposed so that the observer views the rigid translucent screen only as a reflection on the beamsplitter, concavity of the screen being thereby disguised.

* * * * *